INVENTOR.
STANARD R. FUNSTEN
BY Philip Subkow
ATTORNEY.

Patented July 24, 1951

2,561,852

UNITED STATES PATENT OFFICE 2,561,852

PROCESS AND APPARATUS FOR CATALYTIC REACTIONS AND ADSORPTIONS

Stanard R. Funsten, Pasadena, Calif., assignor to Filtrol Corporation, Los Angeles, Calif., a corporation of Delaware Application May 5, 1944, Serial No. 534,359

4 Claims. (Cl. 23—1)

This invention relates to a process and apparatus for carrying out chemical reactions and adsorption involving the use of surface-active materials which may act either as adsorbents or catalysts, in which the solid active material is moved counter-current to the passage of vapors undergoing adsorption or reaction through multiple beds of said material maintained in superimposed position and with provisions made for separating the several superimposed zones from each other to direct the passage of gases or vapors from zones to obtain the desired contact.

Provision is also made on each bed for the continuous disruption and the simultaneous recreation of each bed and for the continuous and controlled passage of the reactant vapors or gases through each constantly disrupted and recreated bed.

My process and apparatus also comprehend provision for the continuous and uniformly controlled movement of said surface-active material from zone-bed to zone-bed, for the continuous and contolled removal of spent material from the end reaction zone, for the continuous and controlled feed of said active material into each of the said zones of adsorption or reaction, and for the continuous, complete, and intimate countercurrent contacting of all of said vapors or gases with all of said surface-active material while said material passes through each of the superimposed reaction zones.

My process also comprehends the regeneration or desorption of the spent or inactive surface-active material in a separate regeneration zone, in which is also provided multiple zones. In each of said zones is positioned a bed of such spent material, preferably in superimposed relationship to each other. The material passes in controlled and uniform movement from zone to zone. Means are provided for sealing each zone from the contiguous zones against the passage of regeneration gases therein between. Means are also provided for continuously disrupting and simultaneously recreating the beds of the spent material in each zone. Regenerating or adsorptive gases are supplied uniformly and under controlled conditions into each zone.

Provision is also made in my regeneration or desorptive stages for the independent removal of the products of regeneration or desorption separately from each of the said regeneration zones and for the separate introduction of said regeneration or desorption vapors or gases into each of said multiple zones of regeneration or desorption.

Provision is also made for the continuous, controlled, and uniform withdrawal of the regenerated material from the end regeneration zone and for the continuous controlled and uniform introduction of spent material into the said superimposed multi-regeneration zones.

Provision may also be made in said zones for the control of temperature by introducing a suitable temperature modifying medium into said zones either in suitable embedded coils in the zone beds or hearths or otherwise, and if water was used in such coils as the temperature modifying medium, the effluent might be adjoined to a conventional boiler system of suitable design for salvage.

In processes involving surface reactions, whether they be either or both adsorptive or catalytic, an important problem is the uniform distribution of vapor and surface-active solid material throughout the zones of reaction so that the vapors contact the solid material and without channelling and without any by-passing of areas or quantities of the surface-active material. To put this otherwise, the ratio of the volume of the surface-active reagent to the volume of the vapors undergoing reaction, particularly in the process of catalysis, is one of the critical controls necessary in all such reactions.

Where the reactant vapors pass through a catalyst so that a portion of the catalyst is in contact with none or with a smaller or greater amount of vapors than the average ratio throughout the whole or entire zone of reaction, then the resultant character or the quantity of reaction which may be obtained may be substantially different than in a zone of reaction wherein the vapors and the catalysts are subjected to contact in more close approximation of such ratio. Vapors and gases passing through a bed of solid material will tend to channel and seek the course of least resistance through the bed, and this is true even where the bed moves as a body through the zone of contact. My invention overcomes this faulty operation.

By my invention, not only is harmful channelling completely avoided but the full utilization of all of the surface-active material is also readily attained. These novel results are induced by the controlled and continual disturbance together with the uniform recreation of the beds, thereby disrupting any possible channels of migration of the reactant vapors and gas, and such continuing disruption of the beds is accompanied and simultaneously with the immediate recreation of new and uniform beds of surface-active material.

In my process also there is a continual physical agitation or controlled mechanical movement of all of the particles of high surface activity in said bed. As a result thereof new surfaces and uncontacted material in each zone are exposed to vapors or gases entering the zone. The result of this agitation, disruption, and recreation of the bed is a more uniform contact or reaction across the bed and a much closer regulation of the ratio of the volume of reactants to the volume of surface-active material engaging in said reaction.

My process also eliminates other types of harmful operating variations in reaction in the bed. This is particularly so for temperature variations throughout the bed, thereby permitting a more closely controlled and more nearly isothermal contact throughout each bed, thus making it readily possible to utilize fully all of the surface-active material under the preferred conditions of reaction or adsorption.

What has been said for the zone of reaction also applies in large measure to the zone of regeneration or desorption. In the zone of regeneration, provision is made in my process for the separate removal, from each of the multiple regeneration zones, of the vapor and gas products of desorption or regeneration so that the spent gases or vapors resulting from regeneration or desorption from one bed are not passed to contiguous beds or counter-currently through the succeeding beds of the entire charge of the spent material being regenerated. In addition, I propose that the regenerating gases be introduced incrementally into the spent material by separate introduction of fresh regenerating or desorption vapors or gases into each zone or into groups of zone-beds in a controlled volume and at a controlled temperature. By this method a higher concentration of regenerating gases (e. g. as higher concentration of oxygen) can be brought into contact with the spent material being regenerated than is possible or permissible where all of the regenerating gases pass either counter-currently or concurrently through the whole body of the material undergoing regeneration or desorption.

A particularly useful application of my invention is in the continuous catalytic conversion of petroleum vapor into high octane gasoline and other products. This application, as well as the general principles of my process and apparatus, will be further described in connection with the drawings of which:

Figure 1:
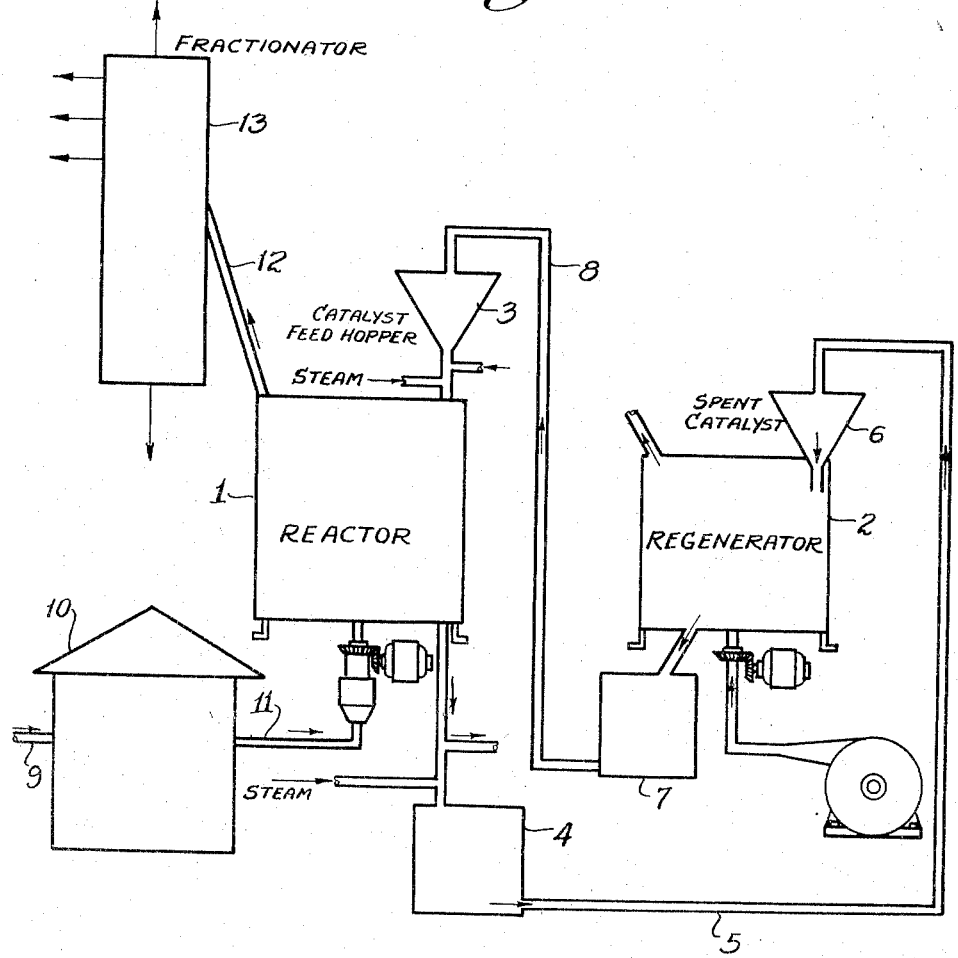
Figure 1 is a diagrammatic method of the application of my invention to such catalytic process.

In Figure 1 the solid surface-active material previously mentioned and in the form useful as a catalyst is circulated continuously through the reactor 1, thence through regenerator 2, and thence after regeneration the revivified catalytic material is continuously fed back into reactor 1 for reuse. As a catalytic reagent passes downwardly into and out of each of the reaction zones or conversion chambers, heated petroleum vapors pass upwardly through the reactor, as will be subsequently described, and transversely through each of the of the reaction or conversion chambers of the reactor. Its passage through the reactor is generally counter-current to the passage of the catalyst.

To described further this single application of my invention in general terms, the surface-active or catalytic conversion material is continuously fed as by a screw conveyor, belt, or other means into chain-driven bucket-elevator 8 of Figure 1, thence to catalyst feed hoppers 3, from which the catalyst is withdrawn at a controlled rate into reactor 1, which will be described hereinafter. Emerging from reactor 1, the catalytic material is routed at a controlled rate into discharge bin 4, from which it passes to chain-driven bucket-elevator 5, in which the used or spent catalyst is elevated for discharge into one or more feed-hoppers 6 for passage through regenerator 2, wherein the carbonaceous, gummy, and other impurities adsorbed by the catalyst are burned away under controlled conditions.

The reactivated catalyst is discharged from the regenerator into bin 7. The regenerated material is withdrawn from bin 7 by a conveyor into elevator 8 whereby the cycle is completed.

To further continue the broad description of this application of my invention, any type of charging stock which may be cracked, such as a gas oil, is routed through line 9 into heater 10, where it would be vaporized and possibly then freed of any possible heavy tar content, and while in its vapor phase and hereinafter termed reactant, it would be fed into reactor 1 through line 11. After passage of such vapors through reactor 1, as will be subsequently described, and wherein they are subjected to catalytic conversion, the converted vapors emerge from the reactor through line 12, whence they pass to the usual fractionation zone 13.

Figure 2:
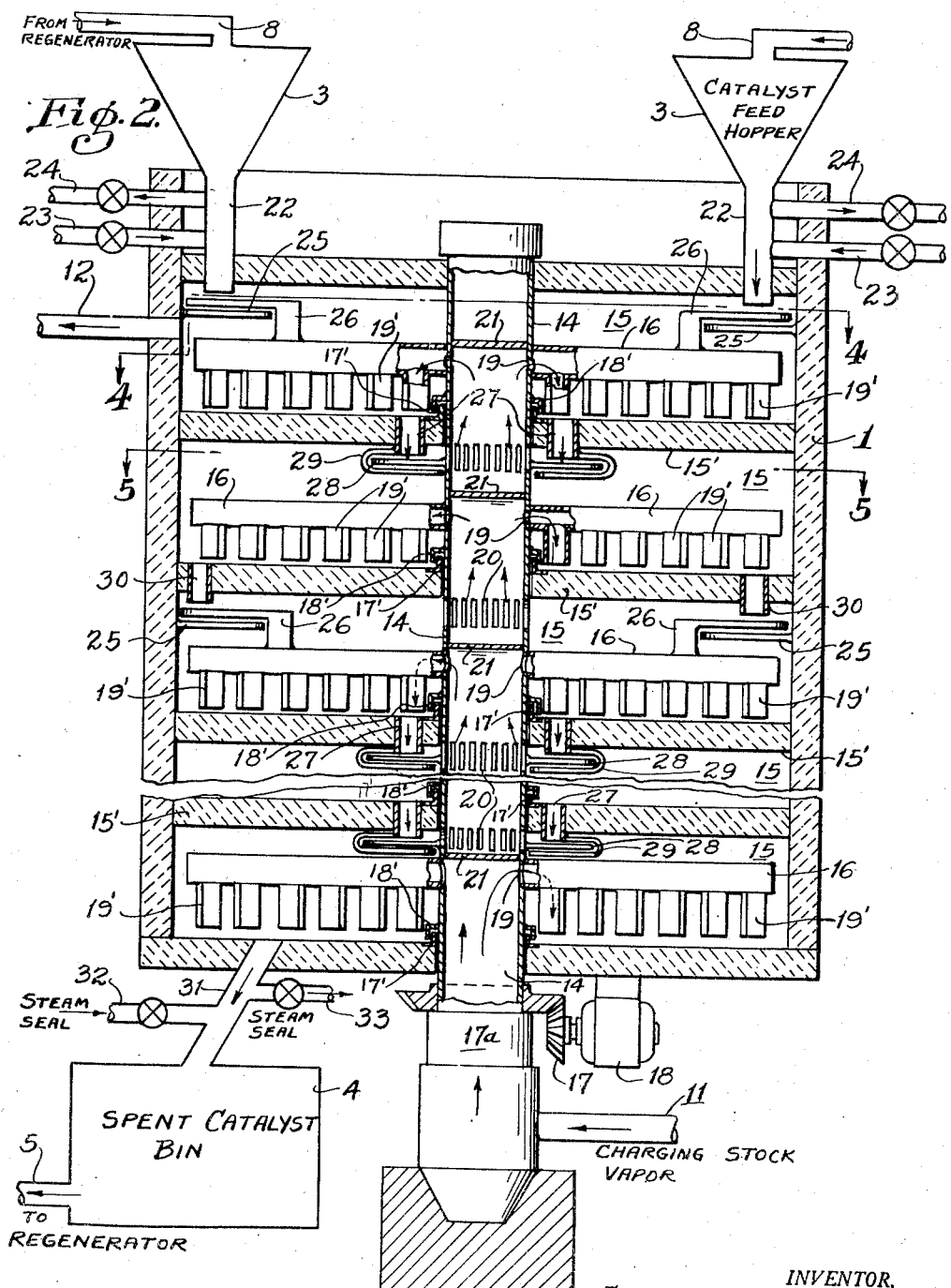
Figure 2 is a vertical section of a multi-zoned reactor.

The reactor in Figure 2 consists of zones 15, mounted one above the other and each separated from the other by hearths 15', which may be of any suitable heat-resisting brick or tile construction or may be of metal. These beds are structurally supported upon the reactor walls.

Feed leg 22 from catalyst feed hoppers 3 is of sufficient length to provide, when filled with catalyst, a seal against the passage of reactant vapors from the reactor, and this same effect is supplemented by steam pressure seal 23—24 operating on legs 22, which also acts to purge the catalyst passing to the reaction zone of entrained oxygen.

Mounted centrally in the reactor is a hollow shaft 14, which is supported at the top and bottom of the reactor by suitable bearings. The shaft is revolved at a suitable speed by gearing 17 driven by motor 18.

Shaft 14 extends upwardly through the hearths 15'. The vertical dam 17' is provided concentric with the shaft 14 and of a suitable height. A dependent baffle 18' is mounted on the shaft 14 concentric with the dam. This combined structure prevents the passage of the catalyst between the shaft and the hearths. It also minimizes any passage of vapors between the shaft and the hearths.

Mounted to shafting 14 in each zone are a number of rotating rabbling arms 16. Four of such rabbling arms are shown in each conversion zone, but either a larger or smaller number may be used either in any one zone or in all zones. These rabbling arms are of hollow tubular construction. These arms communicate through an opening 19 with the shaft. The reactant vapors passing through the shaft pass through the rabble arm and through the hollow rabbling or reactant-feeding teeth 19'. A plurality of such teeth are mounted along the rabble arm, uniformly spaced along the arms. The reactant passes from the hollow section of the rabble arms into and out of the rabbling teeth and emerges into the mass of surface-active or catalytic material on the hearth of the conversion zone, and through which catalytic material both the rabbling and feeding teeth are moving.

It is in the manner just described that the heated petroleum vapors are contacted intimately with the catalyst.

On each rotor in each of the alternate zones is mounted a feed bar or knife 26, and as the rotor arm passes beneath feed shelf 25, which is secured to the reactor walls, the feed bar engages with the supply of catalytic material deposited on feed shelf 25 as it emerges from feed leg 22 or the downcomers 30, and the catalytic material thereon is fed to the bed of the conversion zones. Similarly in alternate zones downcomers 27 are positioned near the shaft 14. Each such downcomer carries a shelf 29. Across each shelf passes a feed bar 28 mounted upon the shaft 14. The purpose for this method of feed of catalytic material to the upper zone and similarly for the underlying zones, in which the same feeding mechanism is used, is to control and secure uniformity in the feed of catalyst to each zone from the zone lying next above and is also to provide a pressure seal against the passage of reactant vapors upward through either feed leg 22 and in a similar fashion through all of the other interzone down holes 30 and 27 located in the zones of the reactor. This seal is maintained by the height of the column of catalyst equal to the depth of the bed, the height of the downcomer, and the mound on the shelves 25 and 29.

The feeding and rabbling teeth 19' previously mentioned are mounted to the rotor arms 16 at a suitable angle so as to provide for a rabbling movement outwardly of the bedding of catalytic material on the hearths of the chambers in which the drop holes 30 are located near the outer walls of the reactor, and in the alternately superimposed zones, the rabbling teeth are mounted at an opposite angle on the revolving rotors arms so as to rabble the surface-active material inwardly in such zones to the multi drop holes 27, which in the alternately situated zones underneath are located in close proximity to the rotor shaft drive.

By the use of the above noted procedure, the catalytic material is subjected to an agitation and simultaneously is also being slowly propelled, raked, or rabbled by the rabbling blades on the rotor in the upper zone toward the center of the bed of the upper conversion zone and subsequently on the alternately placed underlying zone to a series of drop holes 27 positioned near the center of the reactor.

The catalyst thus moves across the hearths in the conversion zones and passes to the succeeding hearths. The disturbed beds are re-constituted so as to insure contact between the teeth and the material of the bed. The vapors thus pass from the orifices in the teeth through the bed of material surrounding the teeth. The re-constitution of the bed is assisted by the shape of the teeth, which may be plow-like in character, which act to turn over the rabbled material in the beds so as to cause the material to fill in behind the teeth. It is further assisted by reason of the following catalyst material which is rabbled forward by the following arm. Additional rakes or arms supported on the rotating shaft may be provided to move the material so as to fill in behind the teeth.

The catalyst passes downward through the feed leg 22 and the downcomers 30 and 27 and deposits in a mound on the shelves 25 and 29. No further motion of the catalyst on such shelves need occur until the bars 26 and 28 sweep across the mound and discharge the deposited catalyst to the hearth below.

The catalyst is then slowly rabbled transversely across such successive beds until the catalyst emerges from the bottom catalytic zone of the reactor through discharge leg 31 and into spent catalyst bin 4, from which it is then continuously withdrawn, as previously described, through line 5 for regeneration and re-use.

On spent catalyst discharge leg 31, there is interposed a steam pressure seal 32—33, which serves dually to purge the emerging catalyst of any entrained or suspended reaction products and also to prevent by pressure difference the emergence of reactant vapors from the reactor.

As previously described, the heated reactant vapor is charged to line 11, which is connected with the open central section of reactor shafting 14 through a hollow thrust bearing 11a. The reactant vapors are charged, at a pressure sufficient for proper passage through the reactor, into hollow shaft 14 and emerge from the shaft 14 through orifice 19 into the hollow rotor arms 16. A seal 21 in the form of a diaphragm is positioned in shaft 14 above opening 19, prevents the further upward movement of the reactant vapor in shaft 14. Vapor passes into the hollow lengthwise central section of the rotor arms. The reactant emerges from the hollow section of the rotor arms through the plurality of rabbling feed blades or teeth 79', spaced along the entire length of each of the rotor arms, and through the slowly moving catalyst bodies on the bed and are thereby brought into intimate contact with the active particles of the bed of the catalytic material, which is being slowly moved and rabbled on the floor of each conversion zone.

The reactant, leaving the bed of the catalytic material, ascends to the disengaging space in the upper section of each of the reaction or conversion zones, exits from the conversion zones through a series of suitable openings, such as orifices or slots 20 in shaft 14, and again enters into the open central section of shaft 14, in which the reactant again travels upwardly until again it encounters a seal 21 in the shaft 14. This seal similarly directs the reactant again into the hollow rotor arms for repeated emergence through the reactant feed and rabbling teeth. The vapors are sealed off from the upper beds by the bed of material on the shelves 29 and 25 and by the height of the column of material in the downcomers 27 and 30. The space between the nesting baffles 17' and 18' and the bed of clay contiguous thereto seal the clearance between the shaft and the bed against vapor leakage. The converted reactant exits from the upper catalytic conversion zone of the reactor through line 12 for subsequent subjection to the usual fractionation, etc., as previously mentioned.

As an example of one operation for cracking, the reactant gas oil kerosene naphtha vapor emerges from heater 10 and contacts the surface-active catalyst in the bottom catalytic chamber of the reactor 1 at a temperature ranging from 800 to 1000° F., and at a pressure sufficient to overcome the pressure drop through the reactor and for fractionation.

In this particular example of my invention, my choice of optional surface-active or catalytic material is quite large and includes among others such products as virgin or chemically processed bentonites, bauxite, sub-bentonites of the montmorillonite family, and the like, either by themselves or promoted by combination with such metals as vanadium, tungsten, molybdenum, cobalt, aluminum, chromium, etc., or their oxides, salts, or in other forms. I may also employ these oxides as mixed gels, as for instance a silica alumina gel or silica magnesium gel, etc. Preferably and for this illustration of my invention, I select an activated sub-bentonite in granular or pelleted form which might be approximately of 1/8" diameter and length but either larger or smaller forms or shapes of different surface-active or catalytic materials may also be used in my invention.

As one method, to prepare such a catalytic conversion media with the required high surface-activity, a selected sub-bentonite clay of the montmorillonite family may be subjected to coarse grinding. It may then be treated with sulphuric acid of concentration of from 5% to 60% employing from 20 lbs. to 150 lbs. of anhydrous acid per 100 lbs. of clay. The calcium and magnesium in the clay are base exchanged and are removed to form the hydrogen montmorillonite. There is also removal of $R_2O_3(Al_2O_3)$ and $(Fe_2O_3)$ and removal of magnesium from the lattice of the raw clay. The temperature employed in the manufacture of the preferred catalyst ranges from 180° F. to 210° F. The time employed might range from 3 to 9 hours. A suitable clay thus treated will contain from about 10% to about 20% of $R_2O_3$.

Before formation into special granular shapes or before pelleting or impregnating as above mentioned, the treated or activated clay slurry is thoroughly washed by counter-current decantation as in thickeners of the Dorr type, and the treated solids in the thickened and washed slurry are then separated from the liquid, as by filtration, dried, and ground. After grinding, the surface-active or catalytic material may be plasticized and/or impregnated as in a pug mill and then pelleted to suitable size for use in this disclosed processing and dried to finished volatile moisture content.

Figure 3:
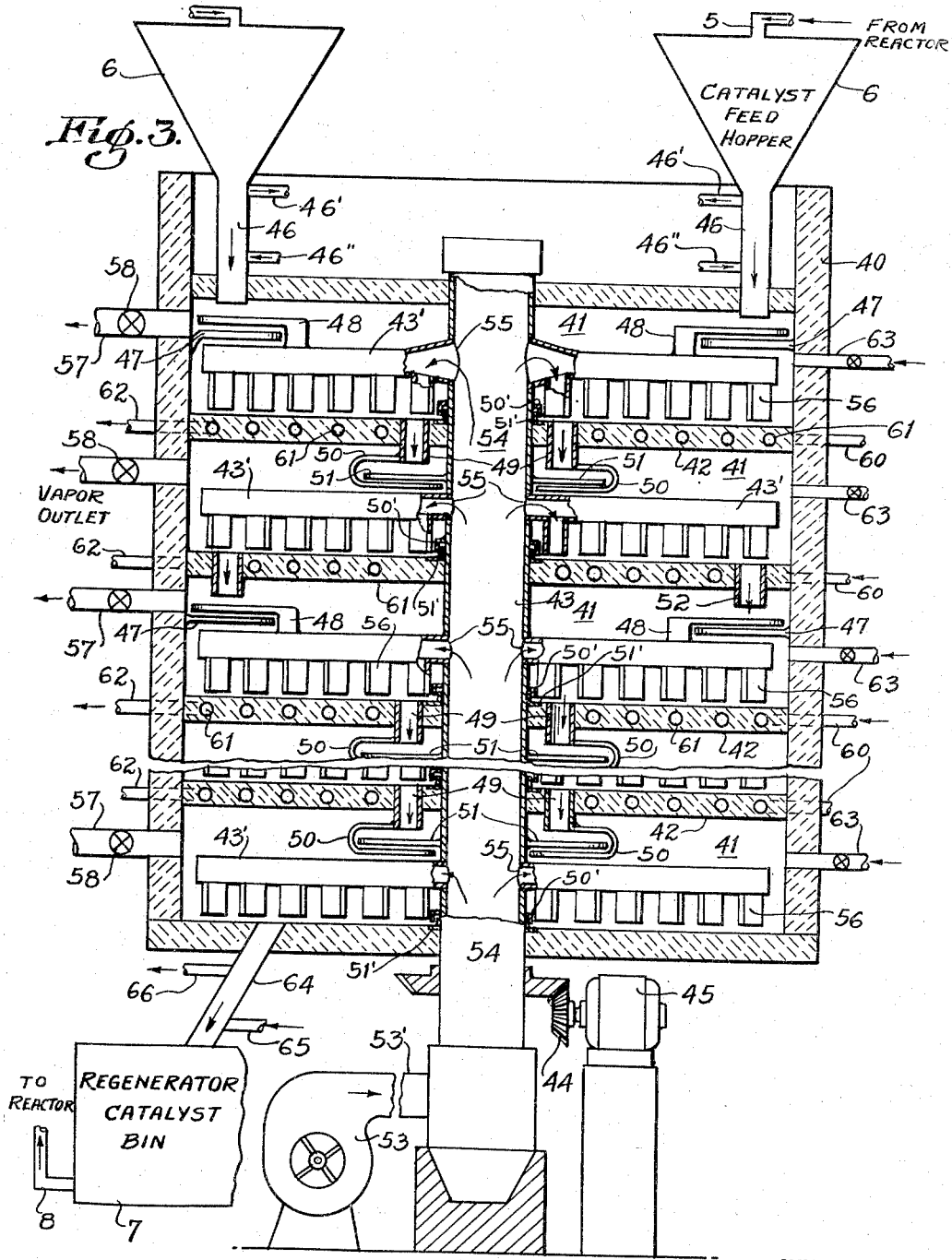
Figure 3 is a vertical section of a multi-zoned regenerator.
Figure 4:
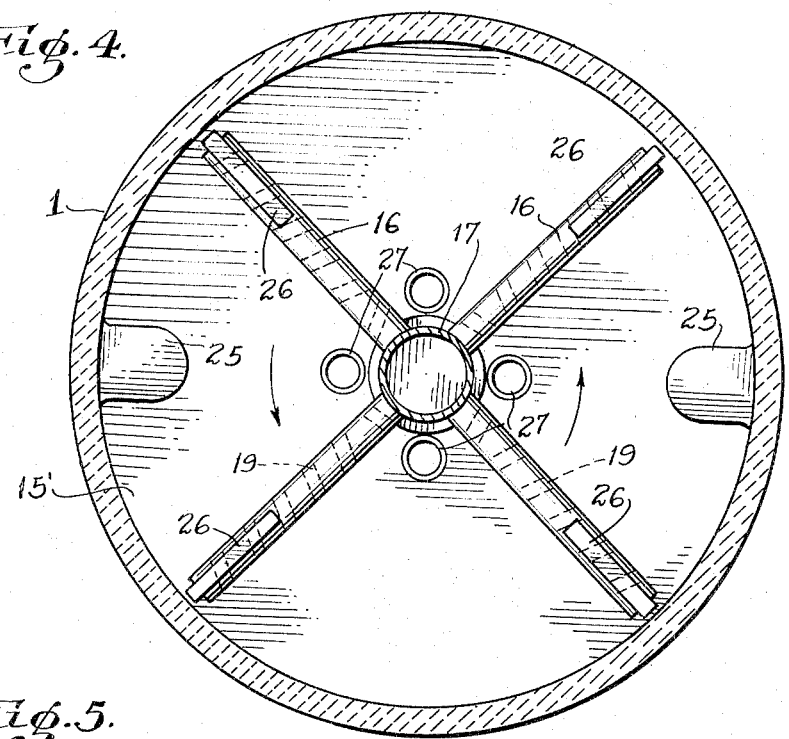
Figure 4 is a section taken along line 4—4 of Figure 2.
Figure 5:
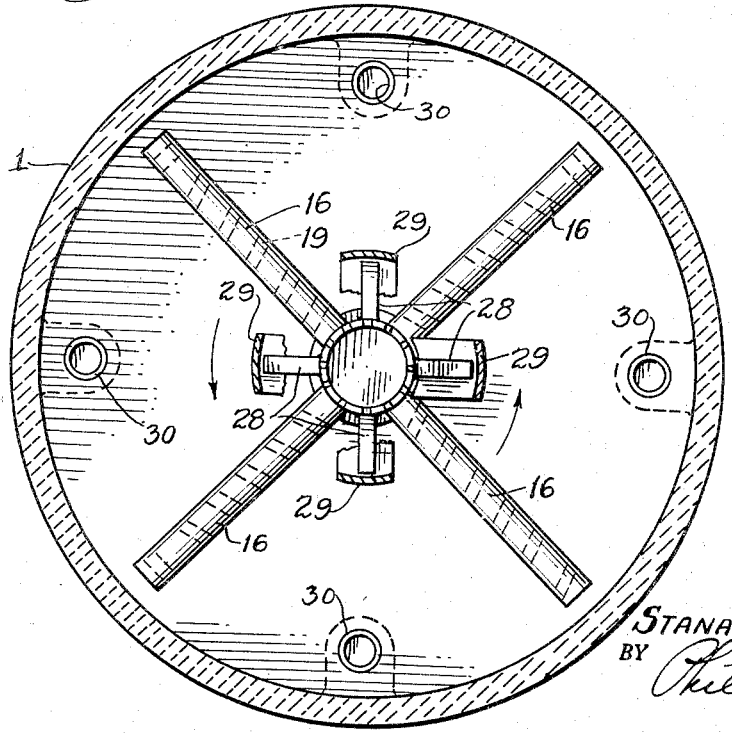
Figure 5 is a section taken along line 5—5 of Figure 2.

The regenerator, as shown in Figure 3, in general of similar construction to the reactor 1, is for the purpose of regenerating the spent catalytic material from the reactor and consists of a plurality of regenerating zones 41 on hearths 42, mounted one above the other. The hearths or floors of the zones consist of suitable brick, tile, or metal and are structurally secured to the regenerator walls. Mounted centrally in the regenerator is a hollow shaft 43, supported at the top and bottom of the regenerator by suitable bearings and revolved by a suitable gearing 44, driven by motor 45.

Mounted to shaft 43 in each of the zones of the regenerator are a plurality of rotating rabbling arms 43', carrying hollow teeth 56. These rabbling arms are hollow and communicate with the hollow shaft 43. Air or a mixture of air and inert gas introduced by fan 53 passes through 53' through the shaft 43 into and through rabble arms 43', through orifices either in the side or at the bottom, or both, of rabbling teeth 56.

For its regeneration and as diagrammatically shown in Figures 1 and 3, the spent surface-active or catalytic or adsorbent material from the reactor is conveyed by bucket-elevator in line 5 to either one or more than one feed hoppers 6, from which the spent material is withdrawn through leg 46 at a controlled rate by feeder mechanism 47 and 48, which are of similar construction and operation to feeder mechanism 25 and 26, described previously under Figure 2. Feed leg 46 from feed hopper 6 is of sufficient length to provide, when filled with spent catalyst by pressure drop, a seal against the passage of regeneration or desorption products, such as ignition or combustion vapor, from the regenerator. This is aided and supplemented by a purging pressure seal, as by steam as shown by 46' and 46" operating on leg 46. The spent material to be regenerated falls to feeder shelf 47 and, as previously described, forms a seal, preventing the escape of regeneration vapors or gases out of the upper zone of the regenerator through feed leg 46. Feeder shelves 47 are located in the upper zone of the regenerator and also in the hearths 15 in the alternate zones lying below. These shelves are secured to the regenerator wall. Feed bars or knives 48 employed in these same zones are secured to each of the rotor arms 43'. As each of the rotor arms in these zones passes beneath the feed shelves 47, feed bar 48 passes between the bottom outlet of feed leg 46 or downcomers 52 and the feed shelf and sweeps the mass of surface-active particles or catalytic pellets from the feeder shelf, and the catalyst falls to the bed beneath. It is slowly agitated and rabbled and moved across the hearth to the downcomers 49 in the hearth positioned near the shaft 43. The catalyst descends through the downcomers 49 and is deposited on shelf 50 mounted on the downcomer 49.

Feed bars or knives 51 are mounted on the shaft 43 and pass between the downcomers 49 and the shelves 50.

The clearance between the shaft and the hearths is sealed by means of the circumferential dam 51' positioned on hearths 42 cooperating with the circumferential dependent member 50'.

The catalyst is thus fed through feed leg 46 and deposited on shelf 47. It is swept from shelf 47 onto the upper hearth. The material on the bed is rabbled, agitated, and moved across the hearth by the teeth 56, which are set at a suitable angle on arm 43, whereupon the catalyst descends through the downcomers 49 to the shelves 50. The knives 57, as they are carried underneath the downcomers 49, sweep the clay to the hearth beneath. The teeth, set at a suitable angle on the rabble arms, agitate and move the material across the hearths to the downcomers 52 to the shelves 47. The knives 47 then remove the material and it descends to the hearths. In this manner the material moves continuously downwardly through the regenerator and across the hearths.

As previously referred to, an oxidizing gas, such as air or its admixture with a suitable inert gas such as flue gas, is forced by fan 53 through leg 53' into the central hollow section 54 of shaft 43. Openings 55 are so proportioned, increasing in size upwardly, to pass a desired proportion of the gases into the rabble arms on each hearth. A predetermined proportion of the oxidizing gases enter the hollow section of the rotor arms 43' in each regenerating zone and from which it emerges from the bottom of the rabbling teeth for uniform dispersion through the rabbled bed of spent material on the floor of each regeneration zone. As described in connection with the operations in the reactor, the beds are continually disrupted and recreated, and in this manner a uniform and regulated contact of gases and solids is formed on each bed.

The spent material, as it descends from hearth to hearth, is regenerated by the combustion of the carbonaceous material deposited on the catalyst. As this contaminant is burned on each hearth, the combustion rate of the carbon becomes smaller as the concentration of the contaminant becomes less. It is harder to burn off. The introduction of fresh air, properly conditioned to give the desired oxygen content, aids in this combustion reaction. Thus the lower and intermediate zones are contacted with oxidizing gas uncontaminated by products of combustion produced in lower zones as is common in conventional counter-current methods of regeneration. The products of combustion are removed separately from each zone through flues 57 controlled by valves 58.

The gases are sealed from passage from zone to zone by the seal provided by the beds of catalyst on the shelves 47 and 50 and the column of material on the downcomers 52 and 47. The nested members 50' and 51' cooperating with the bed of material on the hearths, prevents the passage of gases between the rotating shaft 43 and the hearths. Additionally, a sufficiently low pressure is maintained in the lines 57 to preferentially remove products of combustion from the zones through the lines 57.

In order to control the exothermic heat of reaction, cooling coils 61 may be positioned in or on the zone hearths or in the regeneration zones. Water or oil may be circulated through the coils to control the temperature. In using the catalyst previously referred to, I desire to limit the temperature to about 900° to 1100° F., preferably 1000° F.

The regenerated material is rabbled by arm 43' and discharged through the discharge leg 64 and deposited into bin 7. In order to seal this leg, a steam seal is provided by lines 65 and 66. Thus steam also acts to purge the regenerated catalyst.

While I have described particular examples of my invention for the purpose of illustration, it should be understood that various modifications and adaptions thereof may be made without departing from the spirit of the invention as set forth in the appended claims.

I claim:

1. Method for carrying out catalytic reaction which comprises maintaining a plurality of superimposed beds of catalyst, introducing catalysts into the upper of said beds, and discharging the spent catalysts from the lower of said beds, rabbling said catalysts on each bed by rotating rabble arms positioned on each of said beds, to agitate said beds and move the catalyst on said beds generally transversely across said beds, and discharging said rabbled and agitated catalyst from said beds, and passing it to the next succeeding lower beds, introducing reactant vapors and gases into the rotating rabble arm on lower of said beds, and discharging them from said rabble arms at a plurality of points in said bed as said rabble arm passes through said beds, withdrawing reactant vapors from said bed, and introducing them into rabble arms in the next succeeding upper bed, and thus passing them generally countercurrent to the movement of the catalyst through said beds, removing said reactant vapors from the upper of said beds, and withdrawing spent catalyst from the zone of reaction.

2. A reactor for continuous catalytic reactions comprising a vertical shell, a vapor outlet from the top of said shell, hearths in said shell, a vertical rotatable hollow shaft positioned centrally of said shell and passing through said hearths, downcomers placed on alternate hearths near said shell and near said shaft on the intermediate hearths, hollow rabble arms positioned on said hearths and communicating with said shaft, hollow rabbling teeth on said rabble arms and communicating with said arms, orifices in said teeth, openings in said shaft above said rabble arms communicating with the space above the hearths, diaphragms across said hollow shaft between said openings and the said rabble arms, a vapor inlet to the bottom of said shaft, means to rotate said shaft, a catalyst feed hopper connected to the top hearth and a catalyst discharge conduit from the bottom hearth.

3. In the reactor of claim 2, shelves positioned underneath said downcomers, feed blades positioned on said rabble arms and adapted to pass between said shelves.

4. An apparatus for continuously conducting catalytic reactions and for regenerating catalyst spent in such catalytic reaction comprising a reactor having a vertical shell, a plurality of hearths in said shell for carrying beds of catalyst, a vertical hollow shaft centrally disposed in said shell, a plurality of hollow rabble arms communicating with and mounted on said shaft extending outwardly therefrom over each of said hearths, each rabble arm having a plurality of perforated hollow projections depending downwardly toward and terminating adjacent the upper surface of the hearth associated therewith, means for introducing vapors to be reacted into one end of said hollow shaft, means effecting communication between the vapor space above said beds of catalyst and the interior of said shaft located above said rabble arms, closure means in the interior of said shaft between said means effecting communication with the vapor space above said beds of catalyst and the point where said hollow rabble arms communicate with interior of said shaft, means for discharging said reactant vapors from the upper of said hearths, means for introducing catalyst into the upper of said hearths, means for passing catalyst from each hearth to the next succeeding lower hearth, means for discharging the catalyst from the lower of said hearths, a regenerator for continuous regeneration of the spent catalyst, comprising a vertical shell, regenerator hearths in said shell, gas discharge flues on said shell above said regenerator hearths, a vertical rotatable hollow shaft positioned centrally of said shell and passing through said regenerator hearths, downcomers placed on alternate regenerator hearths near said shell and near said shaft on the intermediate regenerator hearths, hollow rabble arms positioned on said regenerator hearths communicating with said shaft, orifices in the communication between said last-named arms and shaft, said orifices being larger in size in the communication between the rabble arms positioned on the upper regenerator hearths than on said lower regenerator hearths, hollow rabbling teeth on said rabble arms communicating with said arms, orifices in said teeth, a gas inlet to the bottom of said shaft in the regenerator, means to rotate said regenerator shaft, a catalyst feed connected to the top regenerator hearth, a catalyst discharge conduit from the bottom regenerator hearth, means for conveying catalyst discharged from said reactor into said feed for the regenerator, and means for conveying regenerated catalyst discharged from said regenerator into said reactor.

STANARD R. FUNSTEN.

REFERENCES CITED

The following references are of record in the file of this patent:

UNITED STATES PATENTS

| Number | Name | Date |
|---|---|---|
| 1,806,020 | Parker et al. | May 19, 1931 |
| 1,852,227 | Barstow et al. | Apr. 5, 1932 |
| 2,099,634 | Thorp et al. | Nov. 16, 1937 |
| 2,159,140 | Eckell et al. | May 23, 1939 |
| 2,226,578 | Payne | Dec. 31, 1940 |
| 2,265,837 | Harding | Dec. 9, 1941 |
| 2,273,865 | Houdry | Feb. 24, 1942 |
| 2,320,273 | Gohr et al. | May 25, 1943 |
| 2,336,017 | Jewell et al. | Dec. 7, 1943 |
| 2,367,281 | Johnson | Jan. 16, 1945 |
| 2,372,018 | Ruthruff | Mar. 20, 1945 |
| 2,429,721 | Jahnig | Oct. 28, 1947 |
| 2,444,990 | Hemminger | July 13, 1948 |

FOREIGN PATENTS

| Number | Country | Date |
|---|---|---|
| 109 of 1866 | Great Britain | Jan. 12, 1866 |